United States Patent
Bona et al.

(10) Patent No.: US 6,782,177 B2
(45) Date of Patent: Aug. 24, 2004

(54) METHOD FOR MANUFACTURING AN OPTICAL DEVICE WITH A DEFINED TOTAL DEVICE STRESS

(75) Inventors: Gian-Luca Bona, Hedingen (CH); Roland Germann, Wangen (CH); Ingmar Meijer, Zurich (CH); Bert Offrein, Langnau am Albis (CH); Huub L. Salemink, Groesbeek (NL); Dorothea W Wiesmann, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 10/141,637

(22) Filed: May 7, 2002

(65) Prior Publication Data

US 2002/0178760 A1 Dec. 5, 2002

(30) Foreign Application Priority Data

May 11, 2001 (EP) ............................................. 01810464

(51) Int. Cl.[7] .............................. G02B 6/10; C03B 37/23
(52) U.S. Cl. ........................ 385/129; 385/130; 65/386; 65/391; 438/31
(58) Field of Search ........................... 385/11, 129–132; 438/31; 65/385, 386, 398, 391

(56) References Cited

U.S. PATENT DOCUMENTS

| | | | |
|---|---|---|---|
| 4,358,181 A | 11/1982 | Gulati et al. | 350/96.31 |
| 4,724,316 A | 2/1988 | Morton | 250/227 |
| 4,781,424 A | 11/1988 | Kawachi et al. | 350/96.3 |
| 5,502,781 A | 3/1996 | Li et al. | 385/4 |
| 5,904,491 A * | 5/1999 | Ojha et al. | 438/31 |
| 6,317,528 B1 * | 11/2001 | Gadkaree et al. | 385/14 |
| 6,501,895 B1 * | 12/2002 | Bloechl et al. | 385/129 |
| 6,580,864 B1 * | 6/2003 | Temkin et al. | 385/132 |
| 6,618,537 B2 * | 9/2003 | Temkin et al. | 385/132 |

OTHER PUBLICATIONS

"Characterization of Silicon–Oxynitride Films Deposited by Plasma–Enhanced CVD" Classen, v.d. Pol, Goermans and Kuiper in J. Electrochem Soc. Solid–State Science and Technology, Jul. 1986, pp. 1458–1464.

"Temperature Dependence of Stresses in Chemical Vapor Deposited Virteous Films" by Shintani, Sugaki and Nakashima in J. Appl. Phys. 51(8), Aug. 1980, pp. 4197–4205.

"Stress in Chemical–Vapor–Deposited SiO2 and plasma–SiNx films on GaAs and Si" by Blaaus in J. Appl. Phys. 54(9), Sep. 1983, pp. 5064–5068.

"Stress in Silicon Dioxide Films Deposited Using Chemical Vapor Deposition Techniques and the Effect of Annealing on these Stresses" by Bhushan, Muraka and Gerlach in J. Vac. Sci. Technol. B 8(5), Sep./Oct. 1990, pp. 1068–1074.

\* cited by examiner

*Primary Examiner*—Akm Enayet Ullah
*Assistant Examiner*—Kevin S. Wood
(74) *Attorney, Agent, or Firm*—Wan Yee Cheung (57) ABSTRACT

A method for manufacturing an optical device with a defined total device stress and a therefrom resulting defined birefringence and a therefrom resulting defined optical polarization dependence is disclosed. In a preferred embodiment, a lower cladding layer of an amorphous material with a first refractive index is provided and above that an upper cladding layer of an amorphous material with a second refractive index, which latter is manufactured from a material which is tunable in its stress. Between the lower and upper cladding layer an optical waveguide core is manufactured comprising an amorphous material having a third refractive index which is larger than the first and second refractive index. The optical waveguide core is thermally annealed, after which it has a defined waveguide core stress. The upper cladding layer is manufactured to have a cladding layer stress that together with the waveguide core stress results in the total device stress.

10 Claims, 4 Drawing Sheets

METHOD FOR MANUFACTURING AN OPTICAL DEVICE WITH A DEFINED TOTAL DEVICE STRESS

The present application is related to U.S. patent application Ser. No. 10/141,665 filed on May 7, 2002, entitled "Method For Manufacturing an Optical Device With a Defined Total Device Stress", which is incorporated herein by reference.

FIELD OF THE INVENTION

The invention relates to a method for manufacturing an optical device with a defined total device stress. More particularly, the invention relates to a method for manufacturing an optical waveguide wherein the waveguide core stress and the cladding layer stress sum up to a total device stress with a desired distribution, more particularly, this distribution being such that the optical mode(s) in the waveguides do not experience any birefringence and the polarization dependence is minimized or such that the birefringence and the polarization dependence are set to a desired, defined value.

BACKGROUND OF THE INVENTION

In the article "Characterization of Silicon-Oxynitride Films deposited by Plasma Enhanced CVD" by Claassen, v.d. Pol, Goemans and Kuiper in J. Electrochem. Soc.: Solid state science and technology, July 1986, pp 1458–1464 the composition and mechanical properties of silicon-oxynitride layers made by plasma-enhanced deposition using different gas mixtures are investigated. It is stated that the mechanical stress strongly depends on the amount of oxygen and hydrogen incorporated in the layer. Heat treatment at temperatures higher than the deposition temperature leads to a densification of the film due to hydrogen desorption and cross-linking.

In "Temperature dependence of stresses in chemical vapor deposited vitreous films" by Shintani, Sugaki and Nakashima in J. Appl. Phys. 51(8), August 1980, pp 4197–4205 it is shown that in vitreous silicate glass depending on deposition background pressure different components of tensile and compressive stress occur. Also a hysteresis of the stress is observed.

In "Stress in chemical-vapor-deposited $SiO_2$ and plasma-$SiN_x$ films on GaAs and Si" by Blaauw in J. Appl. Phys. 54(9), September 1983, pp 5064–5068 stress in films of CVD-$SiO_2$ and plasma-$SiN_x$ on GaAs is measured as a function of temperature. Different properties of the stress are observed depending on, e.g., film thickness, doping and annealing parameters.

"Stress in silicon dioxide films deposited using chemical vapor deposition techniques and the effect of annealing on these stresses" by Bhushan, Muraka and Gerlach in J. Vac Sci. Technol. B 8(5), September/October 1990, pp 1068–1074 deals with in situ measured stress as a function of temperature. Different deposition techniques are investigated and in PECVD silica films on silicon substrates a change of the stress sign from compressive to tensile is observed with rising annealing temperature.

U.S. Pat. No. 4,781,424 is related to a single mode optical waveguide having a substrate, a cladding layer formed on the substrate, a core portion embedded in the cladding layer, and an elongated member for applying a stress to the core portion or a stress relief groove for relieving a stress from the core portion in the cladding layer along the core portion. The position, shape and material of the elongated member or the groove are determined in such a way that stress-induced birefringence produced in the core portion in accordance with a difference in thermal expansion coefficient between the substrate and the single mode optical waveguide is a desired value.

In U.S. Pat. No. 5,502,781, integrated optical devices which utilize a magnetostrictively, electrostrictively or photostrictively induced stress to alter the optical properties of one or more waveguides in the device are disclosed. The integrated optical devices consist of at least one pair of optical waveguides preferably fabricated in a cladding material formed on a substrate. A stress applying material, which may be a magnetostrictive, electrostrictive or photostrictive material, is affixed to the upper surface of the cladding material near at least one of the optical waveguides. When the appropriate magnetic, electric or photonic field is applied to the stress applying material, a dimensional change tends to be induced in the stress applying material. The constrained state of the stress applying material, however, caused by its adhesion to the cladding material, causes regions of tensile and compressive stress, as well as any associated strains, to be created in the integrated optical device. By positioning one or more optical waveguides in a region of the device which will be subjected to a tensile or compressive stress, the optical properties of the stressed waveguide may be varied to achieve switching and modulation. Latchable integrated optical devices are achieved by utilizing a controlled induced stress to "tune" one or more waveguides in an integrated optical device to a desired refractive index or birefringence, which will be retained after the field is removed.

U.S. Pat. No. 4,358,181 discloses a method of making a preform for a high numerical aperture gradient index optical waveguide. Therein the concentration of two dopant constituents is changed during fabrication. Concentration of the first dopant, germanium, is changed radially as the preform is built up in order to produce the desired radial refractive index gradient. The concentration of the second dopant, boron, is changed radially to compensate for the radial change in thermal expansion coefficient caused by the varying Ge concentration. B is added to the cladding layer to make the thermal expansion coefficient of the cladding equal to or greater than the composite thermal expansion coefficient of the core. The magnitude of residual tension at the inner surface caused by thermal expansion gradients is reduced and premature cracking of the preform is eliminated.

Disclosed in U.S. Pat. No. 4,724,316 is an improved fiber optic sensor of the type in which a fiber optic waveguide component of the sensor is configured to be responsive to an external parameter such that curvature of the fiber optic waveguide is altered in response to forces induced by changes in the external parameter being sensed. The alteration of the curvature of the fiber optic waveguide causes variations in the intensity of light passing therethrough, these variations being indicative of the state of the external parameter. The improvement comprises coating material covering the exterior portion of the fiber optic waveguide, the coating material having an expansion coefficient and thickness such that distortion of the fiber optic waveguide caused by thermally induced stresses between the coating material and the glass fiber is substantially eliminated. Also disclosed is a support member for supporting the curved fiber optic waveguide, the support member and fiber optic waveguide being configured and arranged to minimize the effects of thermal stress tending to separate the waveguide from the support member.

SUMMARY OF THE INVENTION

According to a first aspect of the invention herein is provided a method for manufacturing an optical device with a defined total device stress and a therefrom resulting defined birefringence, which device is easy to manufacture and at the same time provides a high precision in the resulting birefringence value with the final intent to obtain a defined optical polarization dependence for the optical mode propagating in the device.

The total device stress is substantially determined by the waveguide core stress and the waveguide cladding stress, also referred to as cladding layer stress, both of which can be influenced by thermal annealing processes the device may be subjected to. The waveguide core stress and the waveguide cladding stress can be tuned independently, for example, by variation of the temperature of the respective annealing step. The tuned state, namely, the state when the desired waveguide core stress, the desired waveguide cladding stress, and the desired device birefringence have been achieved, will remain after the annealing step(s). The tuned state can be such that the optical mode(s) in the waveguides do not experience any birefringence and the polarization dependence is minimized, or such that the birefringence and the polarization dependence is set to a desired non-zero-value, e.g., to build an optical mode converter.

The waveguide core-annealing step and its accompanying waveguide core stress are typically predetermined by parameters such as the desired refractive index and the maximum allowed optical losses. The cladding layer stress counteracts the waveguide core stress whereby the overall device stress and the device birefringence can be controlled.

The vice versa effect can also be utilized. Possible restrictions that determine the stress of the cladding layer can be taken into account and the desired value of the device birefringence can be approached or set via the tunability of the waveguide core stress.

The profile of the waveguide core-annealing step as specified in claim 1 has the advantage that desired refractive index can be achieved and furthermore a low optical loss at 1550 nm is realized while the resulting waveguide core stress is combined with a resulting cladding layer stress to achieve a desired birefringence.

The profile of the upper-cladding-layer annealing step can be used to tune the upper-cladding-layer stress such that the optical mode(s) in the waveguide core do(es) not experience any birefringence and the polarization dependence is minimized, or such that the birefringence and the polarization dependence are set to a desired non-zero-value.

The profile of the upper-cladding-layer annealing step may differ from the profile of the core-annealing step specified in claim 1, in particular in the heating and cooling rates. This difference is due to the fact that in the upper-cladding-layer annealing step the results of the core-annealing step shall only be influenced so far that the overall waveguide device stress and with it the birefringence are determined. The parameters are hence selected not to introduce effects that negatively influence the device functionality and in particular not to risk device cracking or cause undesired additional stress. At the same time the parameters achieve a relatively short overall process time.

In contrast to other approaches to avoid stress in planar devices like fabricating stress-relief grooves, no complex processing steps like an additional lithographic mask or etching step are required here. Annealing steps as described here are easily controllable. They only introduce negligible additional complexity and costs.

A difference in the refractive index for TE and TM modes in a waveguiding structure—a birefringence—leads to polarization-dependent effects in an optical component. Most of today's optical communication systems using single mode waveguides are desired to have negligible polarization dependence because in that case polarization control can be neglected. Therefore, the birefringence is one of the most important factors that determines the performance of a waveguide-type optical component part.

The major contribution to the birefringence is induced by the stress in the layered stack of the waveguiding material, i.e., birefringence induced by the waveguide geometry is typically only a few times $10^{-4}$ whereas the stress-induced birefringence is in many cases an order of magnitude larger. A significant process step in fabricating the waveguide is the thermal annealing step of the core layer, comprising preferably SiliconOxyNitride, i.e. $SiO_xN_y$, that is mainly performed to reduce the hydrogen-bond induced optical loss. This annealing step is accompanied by the introduction of stress in the waveguide substantially due to the difference of the thermal expansion coefficient of the layers and the substrate. To control the stress-induced birefringence with a high degree of accuracy it is hence of importance to accurately control for a given material choice of the waveguide core, waveguide cladding, and substrate, the thermal annealing step(s) that the device is subjected to.

Therefore according to a first aspect of the invention herein is provided a method for manufacturing an optical device that by means of one or more annealing steps has a tunable total device stress and a therefrom resulting tunable birefringence and a therefrom resulting controlled optical polarization dependence.

The method comprises a first step of providing a lower cladding layer of preferably amorphous $SiO_2$, that may be doped with elements like Boron and/or Phosphorous, with a first refractive index and a second step of providing above the lower cladding layer an upper cladding layer of preferably amorphous $SiO_2$, that may be doped with elements like Boron and/or Phosphorous, with a second refractive index, and being manufactured from a material that is tunable in its stress. In a third step between the lower cladding layer and the upper cladding layer an optical waveguide core is manufactured comprising preferably SiliconOxyNitride, i.e. $SiO_xN_y$, and having a third refractive index that is larger than the first refractive index and than the second refractive index. In a fourth step the waveguide core is thermally annealed by first keeping the waveguide core at a first temperature between 400 and 600° C. for a preparation time of at least 0.5 hours, then raising the temperature to a second temperature between 1100 and 1280° C. with a heating rate between 2 and 20 K/min, maintaining the second temperature for an annealing time between 2 and 4 hours, and lowering the temperature to a third temperature between 300 and 600° C. with a cooling rate between −0.5 and −3 K/min, after which the temperature is lowered to a fourth temperature above 10° C. Thereafter the waveguide core has a well defined waveguide core stress.

In a possible fifth step the waveguide upper cladding can be thermally annealed by first keeping the upper cladding layer at a first temperature between 400 and 600° C. for a preparation time of at least 0.5 hours, then raising the temperature to a second temperature between 600 and 1280° C. with a heating rate between 5 and 20 K/min, maintaining the second temperature for an annealing time between 2 and 5 hours, and lowering the temperature to a third temperature between 300 and 600° C. with a cooling rate between −0.5 and −10 K/min, after which the temperature is lowered to a fourth temperature above 10° C. Thereafter the upper cladding layer has a well defined cladding layer stress that together with the waveguide core stress results in the total device stress.

The typical step sequence for manufacturing the optical device will be: first, third, fourth, second and then fifth step. This is a sequence which runs from bottom to top, i.e. providing e.g. on a substrate, the lower cladding layer, then depositing thereupon the optical waveguide core, annealing it, depositing the upper cladding layer and annealing it.

The tuned state, namely, the desired waveguide core stress, the cladding layer stress, and the desired device birefringence, will remain after the annealing step(s).

With this method of manufacturing an optical device the stress of the upper cladding layer can be advantageously used to significantly reduce or even compensate the stress of the waveguide core such that the total device stress is minimized. This leads to a minimized birefringence that is fully compensated by properly designing the waveguide core geometry. The extinction of the birefringence results in a minimized polarisation dependence of the optical device. With this method of manufacturing an optical device the birefringence can also be tuned to a defined non-zero value resulting in a defined polarisation dependence of the optical device.

A more complete understanding of the present invention as well as further features and advantages of the invention will be obtained by reference to the detailed description and drawings.

BRIEF DESCRIPTION OF THE DRAWINGS

Examples of the invention are depicted in the drawings and described in detail below by way of example. It is shown in FIG. 1 a schematic cross-section of a waveguide, FIG. 2 a schematic diagram of the correlation between stress in $SiO_xN_y$ and its refractive index after an annealing step at 1145° C., FIG. 3 a schematic diagram of the dependence of stress in PECVD-deposited $SiO_2$ on the annealing temperature T, FIG. 4 a schematic diagram of the correlation of overall optical device birefringence and the planar film stress in the $SiO_2$ upper cladding, FIG. 5 a temperature-versus-time curve of the annealing step for the waveguide core, FIG. 6 a temperature-versus-time curve of the annealing step for the upper cladding layer, FIG. 7 a schematic diagram of the dependence of the slab attenuation on the wavelength, FIG. 8 a schematic diagram of the dependence of the birefringence in the $SiO_xN_y$ waveguide core on annealing time at different annealing temperatures.

All the figures are for sake of clarity not shown in real dimensions, nor are the relations between the dimensions shown in a realistic scale.

DETAILED DESCRIPTION OF THE PREFERRED EMBODIMENT

In the following, the various exemplary embodiments of the invention are described. When referring to an annealing process or an annealing step, a defined technological processing procedure is meant in which the device to be fabricated is exposed to a controlled temperature-versus-time profile in a furnace. When referring to SiliconOxyNitride or SiON, a member of the series of $SiO_xN_y$ compounds is meant, i.e., a member of the series of compounds that include the binary compounds $SiO_2$, i.e. effectively the oxide concentration x therein being x=2, and the nitride concentration y being y=0, and $Si_3N_4$, i.e. effectively x=0, y=4/3. A preferred range therein is 0<y<4/3 and 0<x<2. An even more preferred range is 0.01<y<10 mol % and 0.01<x<90 mol %.

Figure 1:
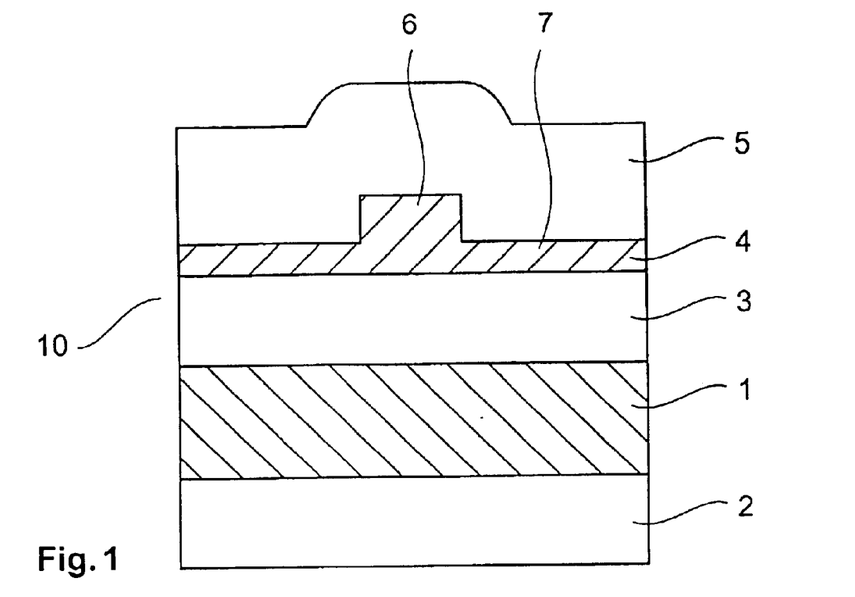

In FIG. 1 a schematic cross-section of an optical waveguide is shown. A substrate 1 bears on at least one side a planar layer that serves as lower cladding layer 3 of the optical device. Adjacent to the lower cladding layer 3 a core layer 4 is manufactured consisting of a core layer portion 7 and a core central portion 6, that extends upwards from the core layer portion 7. An upper cladding layer 5 covers the upper surface of the core layer 4, also referred to as optical waveguide core 4. The materials for the core layer 4 and the upper cladding layer 5 can be tuned in their stress σ. For the function as a waveguide, the lower cladding layer 3 has as a first refractive index $n_3$, and the upper cladding layer 5 has a second refractive index $n_5$, both being lower than a third refractive index $n_4$, which is the refractive index of the core layer 4. The arrangement in total is an optical device, namely an optical waveguide. In principle, the core layer portion 7 can also be omitted, which makes the device a buried-channel waveguide.

Many choices of material are possible for the substrate 1, the lower cladding layer 3, the core layer 4, and the upper cladding layer 5. The substrate 1 usually consists of a commercially available compound, preferably Silicon, but also Sapphire or Quartz could be considered. The lower cladding layer 3 consists of an amorphous material, preferably based on $SiO_2$, that may be doped with elements like Boron and/or Phosphorous. The upper cladding layer 5 consists of an amorphous material, preferably based on $SiO_2$, that may be doped with elements like Boron and/or Phosphorous. The core layer 4 consists of an amorphous material, preferably a ternary- or multi-component based on SiliconOxyNitride, $SiO_xN_y$. In the following $SiO_xN_y$ is also for sake of simplicity referred to in the form SiON.

The typical cross-sectional size for the preferred embodiment of the core central portion 6 can be several μm. The thickness of the lower cladding layer 3 and upper cladding layer 5 is typically between 5 and 20 μm. The thickness of the substrate 1 is typically 0.4 through 1 mm.

Figure 2:
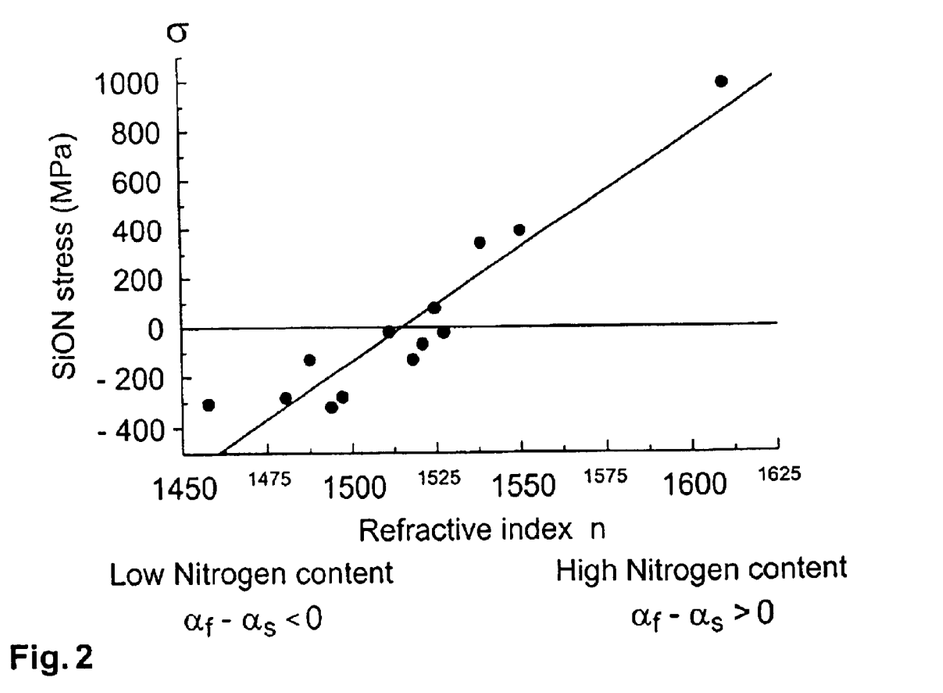

The Nitrogen content of the waveguide core SiON material determines the third refractive index $n_4$ as depicted in FIG. 2. The nitrogen content of the waveguide core layer 4 is hence restricted to a predetermined range when a predetermined third refractive index $n_4$ is desired.

Waveguide Core

In as-deposited SiON the presence of Hydrogen-related bonds, more particularly N—H bonds, the quantity of which being dependent on the preferred deposition technique, examples being LPCVD, APCVD, and PECVD, give rise to optical absorption in the wavelength range around 1510 nm. The tail of this absorption peak extends into the optical signal transmission window that ranges from 1530 nm to 1580 nm. In order to eliminate this Hydrogen-bond-related loss a thermal core-annealing step can be used to extract an amount of the Hydrogen from the SiON material. The Hydrogen desorption and reordering of the glass matrix at elevated temperatures, typically larger than 1100° C., causes a densification of the SiON film that is accompanied by an increase of the third refractive index $n_4$ and a building up of tensile intrinsic stress. The effect on the third refractive index $n_4$ can be taken into account already when depositing the waveguide core 4, particularly by choosing the predetermined concentration of Nitrogen in the SiON material. During the cooling after this annealing step thermal stress builds up due substantially to the difference between the thermal expansion coefficients of the substrate 1 and of the waveguide core layer 4. Different annealing temperatures and dwell times have influence on the intrinsic and the thermal component of the waveguide core stress $\sigma_4$. The dwell time is also referred to as annealing time, being the time for which the device is held at the highest temperature during the annealing process. After such a core-annealing step, low optical losses in the window from 1530 nm to 1580 nm are achieved, however, typically a non-zero waveguide core stress $\sigma_4$ remains as a negative side effect so that the optical waveguide exhibits a stress-induced birefringence, a typical value being $5*10^{-6}$ $MPa^{-1}$. Therefore for the annealing procedure a tradeoff exists between minimizing stress and minimizing loss.

The measured waveguide core stress $\sigma_4$ after the core-annealing step is composed of two components: the intrinsic stress $\sigma_i$, which is due to internal stresses caused by the deposition process, including the thermal history of the waveguide device, and the thermal component $\sigma_{th}$, due substantially to the different thermal expansion of the waveguide core 4 and the substrate 1. The thermal component $\sigma_{th}$ is given by $$\sigma_{th} = \frac{E_f}{1-v_f} \int_{T_1}^{T_2} [a_f(T) - a_s(T)] dT \qquad (1)$$

where $$\frac{E_f}{1-v_f}$$

is the biaxial elastic constant of the waveguide core 4, $\alpha_s$ and $\alpha_f$ are the thermal expansion coefficients for the substrate 1 and the waveguide core 4, respectively, and $T_1$ and $T_2$ are the initial and final temperatures of the core-annealing step, respectively. The upper temperature $T_2$ may be chosen such that stress is effectively relaxed.

One possibility to tune the thermal component of the waveguide core stress $\sigma_4$ of the waveguide core 4 to a desired value is to use specific multi-component materials that allow to tune the thermal expansion coefficient $\alpha_f$ by changing the material composition. This can be utilized to influence the waveguide core stress $\sigma_4$ and with it the stress-induced waveguide core birefringence. For example considering in the series of ternary compounds of $SiO_xN_y$, a film of $SiO_2$ (effectively x=2, y=0) on a Si substrate 1, the difference of thermal expansion coefficients of film and substrate 1 is given by $[\alpha_f(T) - \alpha_s(T)] < 0$. A thermal annealing step at elevated temperatures will therefore cause the $SiO_2$ film to be under compressive stress after annealing. On the other hand, a film of $Si_3N_4$, i.e. $SiO_xN_y$ with effectively x=0, y=4/3, on a Si substrate 1 will be under tensile stress after a similar annealing step because in this case $[\alpha_f(T) - \alpha_s(T)] > 0$. In this example an increase of the Nitrogen content or an increase of the Nitrogen-versus-Oxygen ratio causes an increase of the thermal expansion coefficient of the $SiO_xN_y$ film and therefore a change in its waveguide core stress $\sigma_4$ from compressive via zero to tensile, assuming a Si substrate. This is illustrated in FIG. 2, which shows a schematic diagram of the dependence of the stress of typical PECVD-deposited SiON films on a Silicon substrate versus refractive index n after an annealing step at 1145° C., the refractive index n being a good measure for the Nitrogen concentration and the thermal expansion coefficient of the film.

As an example, a SiON core layer 4 that has a refractive index of 1.53 is deposited by PECVD on a 8 to 9 micron thick $SiO_2$ lower cladding layer 3 that is diffused into a low-doped Silicon substrate wafer 1 via a pyrogenic oxidation process. This wafer is then subjected to a thermal annealing step at a temperature of 1145° C. to minimize the optical losses. The resulting waveguide core stress $\sigma_4$ is about 200 MPa, tensile. On the other hand, a SiON core layer 4 with a lower Nitrogen concentration and therefore a smaller refractive index of e.g. 1.48 would have a compressive waveguide core stress $\sigma_4$ of several hundred MPa after a similar annealing step.

The above shows that in order to tune and/or eliminate the stress-induced birefringence in the waveguide it is advantageous to choose for the waveguide core 4 a ternary- or multi-component material. This material should be chosen such that the difference between the expansion coefficients of the film, i.e. the waveguide core 4, and its substrate 1 for one ratio of the two or more components is $[\alpha_f(T) - \alpha_s(T)] < 0$, i.e. compressive after annealing, and for a different composition $[\alpha_f(T) - \alpha_s(T)] > 0$, i.e. tensile after annealing. In this case, the composition for the waveguide core material can be chosen such that the thermal component of the waveguide core stress $\sigma_4$ and with it the stress-induced birefringence of the core layer 4 can be tuned to a desired value, being it zero or non-zero.

Often the composition of the waveguide core material is however predetermined by parameters such as the desired third refractive index $n_4$. In that case, the range of acceptable compositions is limited and therefore also the range of different thermal expansion coefficient of the film to choose from. In that case, the exact annealing procedures, the core layer 4 and the upper cladding layer 5 are of importance. The waveguide-core-annealing step substantially determines for a given $[\alpha_f(T) - \alpha_s(T)]$ the waveguide core stress $\sigma_4$, which possibly can be compensated (partly) by an upper-cladding-layer stress whereby the total device stress $\sigma_{10}$ and the device birefringence can be controlled accurately.

Upper Cladding Layer

The stress $\sigma_5$ in the upper cladding layer 5 is, in combination with the previously set waveguide core stress $\sigma_4$ of the core layer 4, supposed to tune the total device stress and consequently the device birefringence to a defined value. In most practical application this will be such that the cladding-layer stress $\sigma_5$ compensates or at least reduces the waveguide core stress $\sigma_4$ and hence reduces the detrimental effects of the stress-induced birefringence in the optical device.

The cladding-layer stress $\sigma_5$ is composed of two components: the intrinsic stress $\sigma_i$, which is due to internal stresses caused by the deposition process, including the thermal history of the waveguide device, and the thermal component $\sigma_{th}$ that can be introduced with a upper-cladding-annealing step, which is due substantially to the different thermal expansion coefficients of the upper cladding layer 5 and the substrate 1. The thermal component $\sigma_{th}$ is given by $$\sigma_{th} = \frac{E_f}{1-v_f} \int_{T_1}^{T_2} [a_f(T) - a_s(T)] dt \qquad (2)$$

where $$\frac{E_f}{1-v_f}$$

is the biaxial elastic constant of the upper cladding layer 5, $\alpha_s$ and $\alpha_f$ are the thermal expansion coefficients for the substrate 1 and the upper cladding layer 5, respectively, and $T_1$ and $T_2$ are the initial and final temperatures of the upper-cladding-layer annealing step, respectively.

Figure 3:
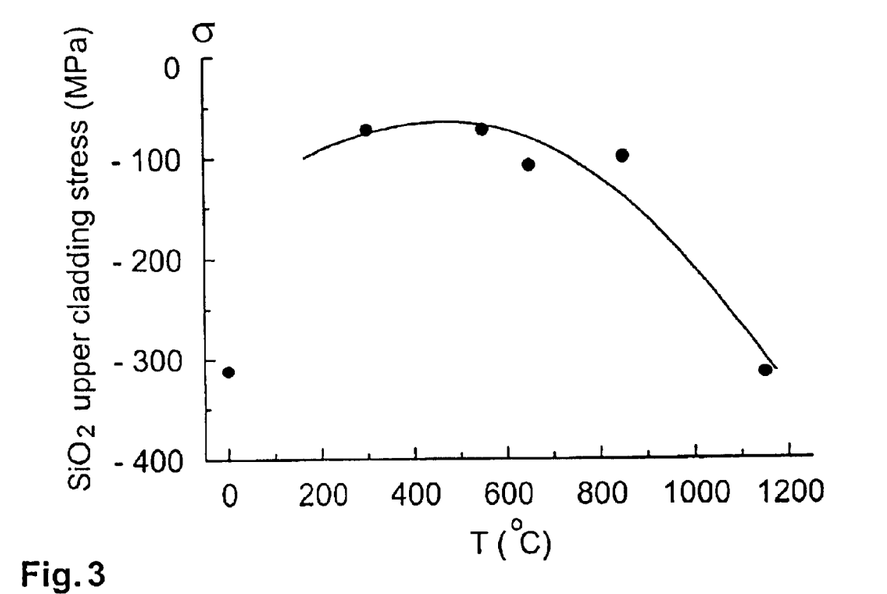

For the upper cladding layer 5 a PECVD-grown $SiO_2$ is used. For this compound the intrinsic stress component $\sigma_i$ dominates to a large extent the thermal stress component $\sigma_{th}$ for moderate annealing temperatures. An as-prepared PECVD $SiO_2$ upper cladding layer 5 is under a compressive stress of typically −300 MPa. The intrinsic stress component $\sigma_i$ results from the structural anisotropy in the oxide film. A low-temperature annealing step can reduce the compressive stress. Upon annealing, the hydroxyl and hydride content is reduced. The $SiO_2$ undergoes densification through the formation of additional Si—O—Si bonds. The new bonding gives rise to strain, the intrinsic stress $\sigma_i$ of the oxide film. Over the temperature range of 300° C. to 850° C., the intrinsic tensile component $\sigma_i$ dominates over the change in compressive thermal stress $\sigma_{th}$. Typically the stress is −100 MPa over this annealing temperature range. Beyond a certain temperature such as 850° C., the bond strains and intrinsic stress $\sigma_i$ in $SiO_2$ start relaxing. The bond network acquires sufficient mobility to rearrange locally and form a more compact $SiO_2$ during the upper-cladding-layer annealing step. For annealing steps at elevated temperatures, typically larger than 1000° C., the thermal component $\sigma_{th}$ substantially dominates because the $SiO_2$ layer becomes effectively relaxed at the annealing temperature and a compressive stress of the order of −300 MPa is built up during cooling, consistent with Equation (2). As example, in FIG. 3 a schematic diagram of the total stress in a PECVD-deposited film of $SiO_2$ on a substrate of Si versus the annealing temperature T is given.

An alternative way to alter the stress $\sigma_5$ of the upper cladding layer 5 is to use, as in the case of the waveguide core layer 6, specific multi-component materials that allow to tune the thermal expansion coefficient $\alpha_f$ by changing the material composition. This can be utilized to influence the upper-cladding-layer stress $\sigma_5$ and with it the stress-induced birefringence. For example considering in the series of multi-component compounds such as $(SiO_2)_x(B_2O_3)_y(P_2O_5)_z$ a film of $SiO_2$, i.e. effectively x=1, y=z=0, on a Si substrate 1, the difference of thermal expansion coefficients is given by $[\alpha_f(T)-\alpha_s(T)]<0$. A thermal annealing step at elevated temperatures will therefore cause the $SiO_2$ film that forms the upper cladding layer 5 to be under compressive stress after annealing. On the other hand, a film of $SiO_2$ doped with typically 25 mol % B and/or P on a Si substrate will be under tensile stress after a similar annealing step because in this case $[\alpha_f(T)-\alpha_s(T)]>0$. In this example an increase of the B and/or P content causes an increase of the thermal expansion coefficient and therefore a change in stress $\sigma_5$ from compressive via zero to tensile, assuming a Si substrate.

Often the composition of the upper-cladding-layer material is however predetermined by parameters such as the desired second refractive index $n_5$, hygroscopic behavior, avoidance of cracking of the compounds, and the like. In that case, the range of acceptable compositions is limited and therefore also the range of different thermal expansion coefficient of the film to choose from. In that case, the exact annealing procedure for the upper cladding layer 5 is of importance. The upper-cladding-layer annealing step substantially determines for a given $[\alpha_f(T)-\alpha_s(T)]$ the cladding-layer stress $\sigma_5$, which possibly can be compensated (partly) by the waveguide core stress $\sigma_4$ whereby the total device stress $\sigma_{10}$ and the device birefringence can be controlled.

Figure 4:
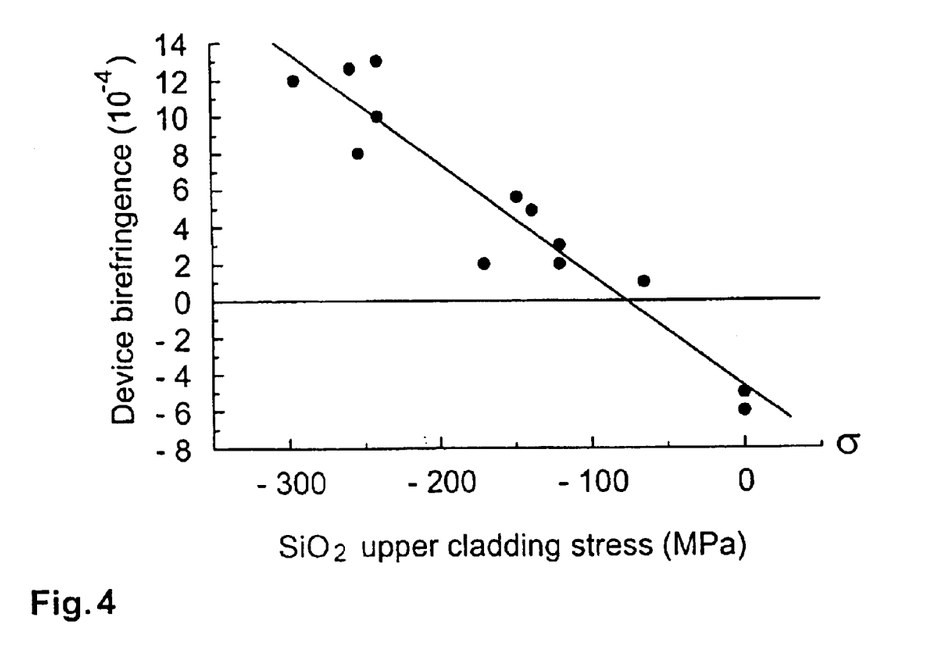

As an example, a SiON core layer is deposited by PECVD on a 8 to 9 micron thick $SiO_2$ lower cladding layer 3 that is diffused into a low-doped Silicon substrate wafer 1 via a pyrogenic oxidation process. This wafer is then subjected to a thermal annealing step that causes a compressive waveguide core stress $\sigma_4$ of several hundred MPa. This waveguide is overgrown with an undoped $SiO_2$ upper cladding layer 5. The geometry of the waveguide core 4 is chosen such that the geometrical birefringence has a defined non-zero value, more particularly, this value being negative. FIG. 4 shows the device birefringence dependence on the planar film stress of the upper cladding layer 5, the latter realized by using different upper-cladding-layer annealing steps. The birefringence is in accord with the typical stress optical coefficient of $5*10^{-6}$ $MPa^{-1}$. This illustrates the method for manufacturing an optical waveguide wherein the waveguide core stress $\sigma_4$ and the cladding layer stress $\sigma_5$ sum up to a total device stress $\sigma_{10}$ with a desired distribution, more particularly, this distribution being such that the optical mode(s) in the waveguide do not experience any birefringence and such that the polarization dependence can be minimized or set to a desired, defined value, making use of specific annealing procedures for the waveguide core 4 and the upper cladding layer 5 disclosed herein.

The specific annealing processes for the waveguide core 4 and the upper cladding layer 5 are described below.

Method of Manufacturing Waveguide Core with Waveguide Core Annealing

Figure 5:
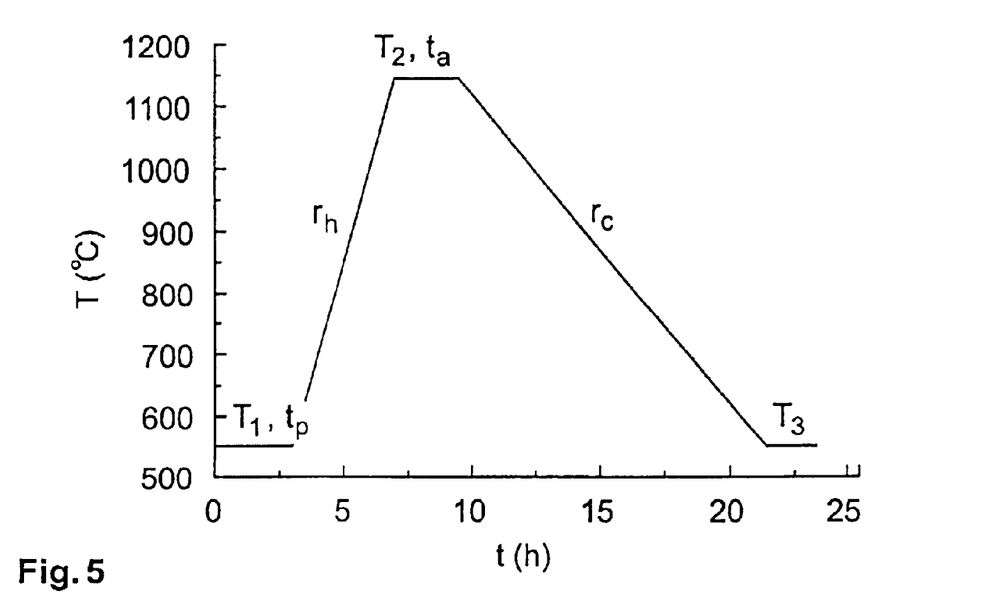

The annealing step for the waveguide core 4 in a Nitrogen atmosphere comprises several sub steps as specified in claim 1. A temperature-versus-time curve of this annealing step is depicted in FIG. 5. First the wafer is kept at a first temperature $T_1$ between 400 and 600° C. for a preparation time $t_p$ of at least 0.5 hours. As a concrete example the values $T_1$=550° C. and $t_p$=180 minutes are taken, which provide particularly good results of this step. This step is performed to purge the atmosphere around the waveguide device with $N_2$. A preparation time $t_p$ of longer than 3 hours would unnecessarily extend the process time. It is a principal interest to keep the overall process time as short whereby of course a dominating principle is not to harm the waveguide device and to eventually achieve the desired waveguide device parameters.

Then the temperature is raised to a second temperature $T_2$ between 1100 and 1280° C. with a heating rate $r_h$ between 2 and 20 K/min. The second temperature $T_2$ therein is chosen such that it is high enough for a significant reduction of the Hydrogen content in the waveguide core 4, it is below the glass transition temperature, and it is low enough so that the crystallization rate is negligibly small. These effects would otherwise eventually harm the waveguide device and thereby deteriorate its functionality. The heating rate $r_h$ is chosen low enough to avoid cracking of the waveguide device and high enough to avoid diffusion processes between the lower cladding layer 3 and the waveguide core 4 that might occur due to the waveguide device resting in a relatively hot environment. This diffusion would detrimentally harm the resulting waveguide device because the index gradient over the waveguide profile would be smoothed and thereby the guiding properties of the waveguide device be affected. As a concrete example the values $T_2$=1145° C. and $r_h$=12 K/min are taken, which provide particularly good results of this step.

After having maintained the second temperature $T_2$ for an annealing time $t_a$ between 2 and 4 hours, the temperature is lowered to a third temperature $T_3$ between 300 and 600° C. with a cooling rate $r_c$ between −0.5 and −3 K/min. The annealing time $t_a$ is chosen such that diffusion processes between the lower cladding layer 3 and the waveguide core 4 are avoided. The cooling rate $r_c$ hereby lies between a lower value that is high enough to avoid inter diffusion between the lower cladding layer 3 and the waveguide core 4 and a higher value that is low enough to avoid stress induced through the annealing process. An extreme effect of cooling down too fast would be cracking the waveguide device. The ramp for cooling down is flatter than the ramp for heating up as can be seen in FIG. 5. As a concrete example the values $t_a$=150 minutes, $T_3$=550° C., and $r_c$=−0.83 K/min are taken, which provide particularly good results of this step.

Finally the temperature is lowered to a fourth temperature $T_4$ above 10° C., typically 20° C. Since the temperature range below the third temperature $T_3$ is less significant concerning induced stress and thermal tension, the value of the cooling ramp in this range is not critical.

Thereafter the optical waveguide core 4 has a low optical loss in the window from 1530 nm to 1580 nm and a defined waveguide core stress $\sigma_4$ accompanied by a defined stress-induced waveguide core birefringence. The device will remain in the tuned state, namely, the desired waveguide core stress $\sigma_4$ and the desired waveguide core birefringence, after the annealing step.

Method of Manufacturing the Upper Cladding with Upper Cladding Annealing

Figure 6:
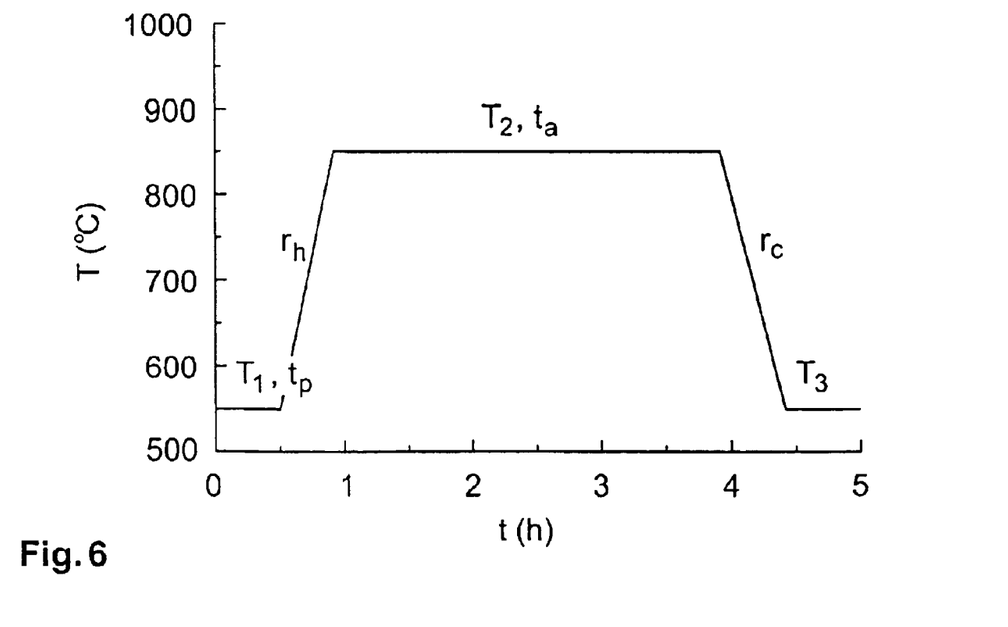

The annealing step for the upper cladding layer 5 in a Nitrogen atmosphere comprises several sub steps. A temperature-versus-time curve of this annealing step is depicted in FIG. 6. First the wafer is kept at a first temperature $T_1$ between 400 and 600° C. for a preparation time $t_p$ of at least 0.5 hours. This step is performed to purge the atmosphere around the waveguide device with $N_2$. A preparation time $t_p$ of longer than 3 hours would unnecessarily extend the process time. As a concrete example the values $T_1$=550° C., and $t_p$=120 minutes are taken, which provide particularly good results of this step.

Then the temperature is raised to a second temperature $T_2$ between 600° C. and 1280° C. with a heating rate $t_h$ between 5 and 20 K/min. The second temperature $T_2$ therein is chosen such that it is high enough to ensure a reduction of the cladding-layer stress $\sigma_5$, it is below the glass transition temperature, and it is such that the crystallization rate is negligibly small. These effects would otherwise eventually harm the waveguide device and thereby deteriorate its functionality. The heating rate $r_h$ is chosen low enough to avoid cracking of the waveguide device and high enough to avoid diffusion processes between the upper cladding layer 5 and the waveguide core 4 that might occur due to the waveguide device resting in a relatively hot environment. This diffusion would detrimentally harm the resulting waveguide device because the index gradient over the waveguide profile would be smoothed and thereby the guiding properties of the waveguide device be affected. As a concrete example the values $T_2$=850° C., and $t_h$=12 K/min are taken, which provide particularly good results of this step.

After having maintained the second temperature $T_2$ for an annealing time $t_a$ between 2 and 5 hours the temperature is lowered to a third temperature $T_3$ between 300 and 600° C. with a cooling rate $r_c$ between −0.5 and −10 K/min. The annealing time $t_a$ is chosen such that diffusion processes between the waveguide core 4 and the upper cladding layer 5 are substantially avoided. The cooling rate $r_c$ is low enough to avoid cracking the waveguide device. As a concrete example the values $t_a$=180 minutes, $T_3$=550° C., and $r_c$=−5 K/min are taken, which provide particularly good results of this step.

Finally the temperature is lowered to a fourth temperature $T_4$ above 10° C., typically 20° C. Since the temperature range below the third temperature $T_3$ is less significant concerning induced stress and thermal tension, the value of the cooling ramp in this range is not critical.

Thereafter the optical waveguide device has a tuned defined total device stress $\sigma_{10}$. The tuned state, namely, the desired waveguide core stress $\sigma_4$, the desired cladding layer stress $\sigma_5$, and the desired device birefringence, will remain after the annealing steps.

Example for Tuning Birefringence by Annealing Steps

Figure 7:
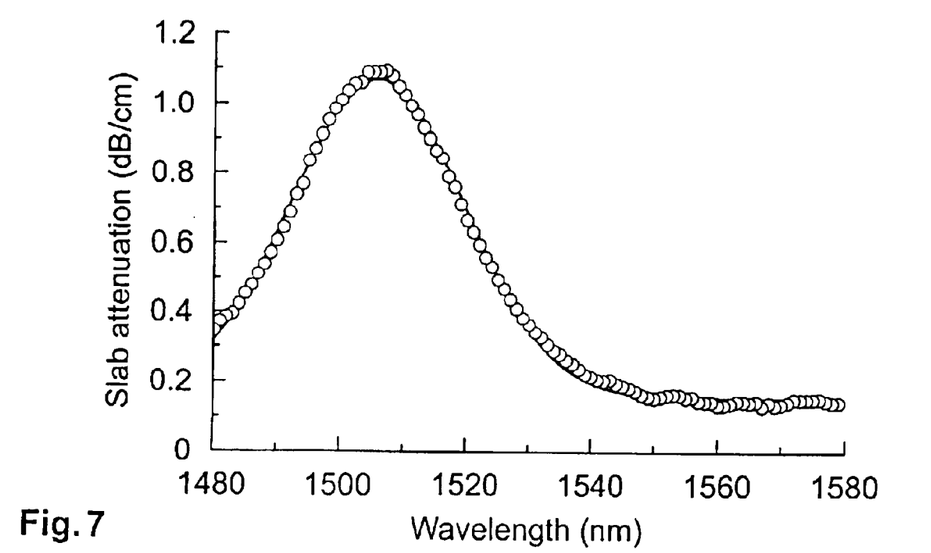

As an example, a SiON core layer is deposited by PECVD on a 8 to 9 micron thick $SiO_2$ lower cladding layer 3 that is diffused into a low-doped Silicon substrate wafer 1 via a pyrogenic oxidation process. For the core-annealing step the wafers are vertically mounted in a SiC slider and loaded into a SiC annealer tube. After adjusting a $N_2$ flow to 5 slm and purging the annealer tube, the core-annealing step as depicted in FIG. 5 is performed. For a second temperature $T_2$ of 1145° C., a heating rate $r_h$ of 2.5 K/min, a dwell time $t_a$ of 2.5 hours, and a cooling rate $r_c$=0.83 K/min the SiON slab loss is shown in FIG. 7. The optical loss is typically 0.2±0.1 dB/cm at 1550 nm and 1.0±0.2 dB/cm at 1510 nm. Roughly, the loss values of the wafers after the annealing step are a factor of 10 times smaller than the loss values of the as-prepared wafers, and hence are one of the significant factors in manufacturing SiON waveguides with adequate low-loss, whilst maintaining a turning radius of 1 mm for bent waveguide sections. Higher annealing temperatures up to 1250° C. lead to lower loss around 1510 nm, the disadvantage being a higher waveguide core stress $\sigma_4$ due to thermal expansion/contraction, and the special requirement for relatively expensive SiC material for operation at temperatures above 1150° C. being the limit for normally used quartz tubes.

Figure 8:
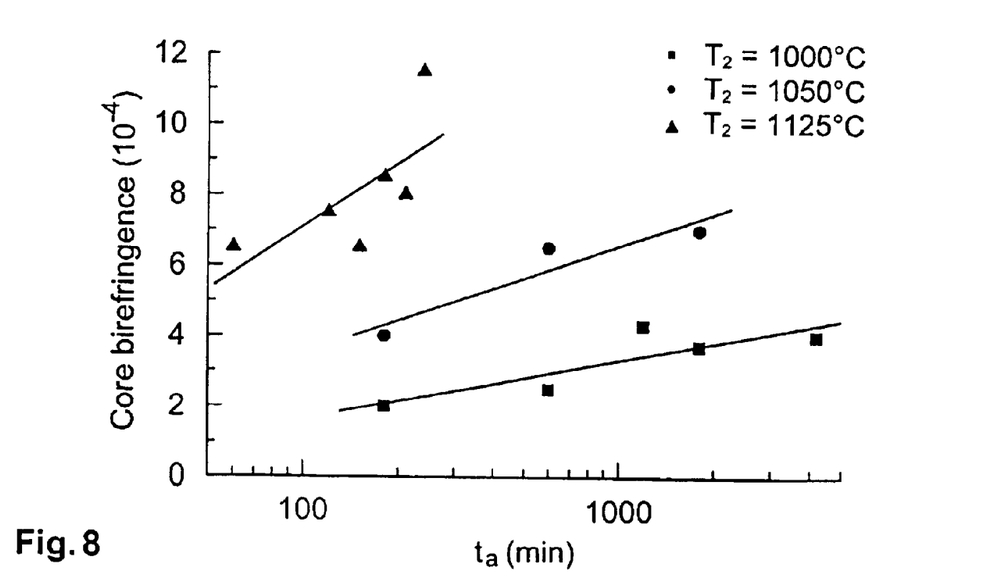

In FIG. 8 the dependence of birefringence in the waveguide core 4 on the annealing time $t_a$ is shown for different second temperatures $T_2$. In the SiON waveguide core 4 with low Nitrogen doping a compressive stress of the order of −300 MPa is built up during the waveguide core-annealing step, whereby $Si_1O_2N_{0.07}$ has been used. A lower annealing temperature $T_2$ as well as reduced annealing times $t_a$ give a lower birefringence, consistent with the picture of thermally induced stress, stress relaxation, and stress-induced birefringence.

After the core-annealing process a photolithographical step follows to define the waveguide core 4 using, e.g., reactive ion etching for forming steep side walls thereof. The geometry of the waveguide core 4 is chosen such that the geometrical birefringence has a defined non-zero value, more particularly, this value being negative, typically $-5*10^{-4}$. Then a PECVD overgrowth is performed at 400° C. for making a $SiO_2$ upper cladding layer 5 with a thickness of 6 micron.

For the upper-cladding-layer annealing step the wafers are vertically mounted in a SiC slider and loaded into a SiC annealer tube. After adjusting a $N_2$ flow to 5 slm and purging the annealer tube, the cladding annealing step as depicted in FIG. 6 is performed. A second temperature $T_2$ of 850° C., a heating rate $r_h$ of 12 K/min, a dwell time $t_a$ of 3 hours, and a cooling rate $r_c$ of −10 K/min are used. With these upper-cladding-layer annealing-step process-parameters the planar stress $\sigma_5$ in the upper cladding layer 5 reduces from typically −270±20 MPa, as-deposited, to −100±20 MPa after the upper-cladding-layer annealing step.

In the case the waveguide device has been heated up to a higher second temperature $T_2$, the cooling process should be performed with a lower cooling rate first and may be switched to a higher cooling rate $r_c$ afterwards. An example would be for a second temperature $T_2$ of 1100° C. to apply a first cooling rate $r_c$ of −0.5 K/min until the temperature is 1000° C. and then to switch to a second cooling rate $r_c$ of −0.8 K/min until the temperature is 850° C. and then switch to a third cooling rate $r_c$ of −5 K/min.

With the, in this example for SiON, given process parameters for the method of manufacturing the optical waveguide core 4 an optical loss of typically 0.2±0.1 dB/cm at 1550 nm and 1.0+0.2 dB/cm at 1510 nm and the waveguide birefringence of typically of the order of $(14\pm2)*10^{-4}$ is realized. The, in this example for $SiO_2$, given process parameters for the method of manufacturing the upper-cladding layer 5 reduce the birefringence to $(3\pm1)*10^{-4}$. Different process parameters can result in birefringence as depicted in FIG. 4. Using this method for manufacturing an optical waveguide with other process parameters can have as result that the optical mode(s) in the waveguides experience any birefringence between $16*10^{-4}$ to $-8*10^{-4}$, including 0, as depicted in FIG. 4.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the present invention.

What is claimed is:

1. A method for manufacturing an optical device with a defined total device stress ($\sigma_{10}$) and a therefrom resulting defined birefringence and a therefrom resulting defined optical polarization dependence, comprising:

a first step of providing a lower cladding layer comprising an amorphous material, having a first refractive index ($n_3$);

a second step of providing above said lower cladding layer an upper cladding layer comprising an amorphous material that is tunable in its stress, having a second refractive index ($n_5$);

a third step of manufacturing between said lower cladding layer and said upper cladding layer an optical waveguide core comprising substantially $SiO_xN_y$, and having a third refractive index ($n_4$) which is bigger than said first refractive index ($n_3$) and than said second refractive index ($n_5$);

a fourth step of thermally annealing said optical waveguide core by:

i) first keeping the optical waveguide core (4) at a first temperature ($T_1$) between 400 and 600° C. for a preparation time ($t_p$) of at least 0.5 hours, ii) then raising the temperature to a second temperature ($T_2$) between 100 and 1280° C. with a heating rate ($r_h$) between 5 and 20 K/min, iii) maintaining said second temperature ($T_2$) for an annealing time ($t_a$) between 2 and 4 hours, iv) then lowering the temperature to a third temperature ($T_3$) between 300 and 600° C. with a cooling rate ($r_c$) between −0.5 and −3 K/min, and v) then lowering the temperature to a fourth temperature ($T_4$) above 10° C., whereby after said fourth step said optical waveguide core has a waveguide core stress ($\sigma_4$), wherein in said second step said upper cladding layer is manufactured to have a cladding layer stress ($\sigma_5$) which together with said waveguide core stress ($\sigma_4$) results in said total device stress ($\sigma_{10}$).

2. The method according to claim 1, wherein said amorphous material comrpising said lower cladding layer is based on $SiO_2$, and wherein said amorphous material comprising said upper cladding layer is based on $SiO_2$.

3. The method according to claim 1, wherein the fourth step is executed in substantially a nitrogen atmosphere with a flow rate of 5 slm.

4. The method according to claim 1, comprising after the fourth step a photolithographical step for defining the dimensions of a core central portion.

5. The method according to claim 4, wherein the photolithographical step comprises a reactive ion etching step.

6. The method according to claim 4, comprising after the photolithographical step a cleaning step.

7. The method according to claim 1, wherein the second step is carried out by a PECVD overgrowth.

8. The method according to claim 1, wherein the upper cladding layer is manufactured at a processing temperature of 400° C. to a thickness of substantially 6 micron.

9. The method according to claim 1, wherein the sum of the resulting cladding stress ($\sigma_5$) and the resulting core stress ($\sigma_4$) causes a birefringence which compensates the geometrical birefringence of the waveguide comprising the cladding layers and the waveguide core.

10. The method according to claim 1, wherein the sum of the resulting cladding stress ($\sigma_5$) and the resulting core stress ($\sigma_4$) causes a birefringence which together with the geometrical birefringence of the waveguide results in a birefringence with a defined value.

* * * * *